(12) United States Patent
Tiemann

(10) Patent No.: US 7,334,412 B2
(45) Date of Patent: Feb. 26, 2008

(54) COOLING AIR AND INJECTED LIQUID SYSTEM FOR GAS TURBINE BLADES

(75) Inventor: Peter Tiemann, Witten (DE)

(73) Assignee: Siemens Aktiengesellschaft, Munich (DE)

( * ) Notice: Subject to any disclaimer, the term of this patent is extended or adjusted under 35 U.S.C. 154(b) by 892 days.

(21) Appl. No.: 10/697,337

(22) Filed: Oct. 30, 2003

(65) Prior Publication Data

US 2004/0088998 A1    May 13, 2004

(30) Foreign Application Priority Data

Nov. 11, 2002  (EP) .................................. 02025194

(51) Int. Cl.
*F02C 6/04* (2006.01)
*F02C 3/04* (2006.01)
*F03D 11/00* (2006.01)

(52) U.S. Cl. .................... 60/785; 60/806; 415/115; 415/117; 416/95; 416/96 R

(58) Field of Classification Search ................ 60/806, 60/785; 415/115, 117; 416/95, 96 R
See application file for complete search history.

(56) References Cited

U.S. PATENT DOCUMENTS

| 3,083,532 | A   |   | 4/1963  | Cook |            |
|-----------|-----|---|---------|------|------------|
| 3,446,481 | A   | * | 5/1969  | Kydd | ........................... 416/92 |
| 3,826,084 | A   |   | 7/1974  | Branstrom et al. |    |
| 4,338,780 | A   | * | 7/1982  | Sakamoto et al. | ............. 60/775 |
| 4,416,111 | A   | * | 11/1983 | Lenahan et al. | .............. 60/795 |
| 4,882,902 | A   | * | 11/1989 | Reigel et al. | ................. 60/806 |
| 4,991,391 | A   | * | 2/1991  | Kosinski | .................. 60/39.182 |
| 5,269,133 | A   |   | 12/1993 | Wallace |    |
| 6,065,282 | A   | * | 5/2000  | Fukue et al. | ............. 60/39.182 |
| 6,612,114 | B1  | * | 9/2003  | Klingels | ...................... 60/785 |

FOREIGN PATENT DOCUMENTS

| DE | 28 52 057 A1 | 7/1979 |
| EP | 0 379 880 A1 | 8/1990 |
| EP | 0 447 886 A1 | 7/1991 |

* cited by examiner

*Primary Examiner*—Charles G Freay

(57) ABSTRACT

The invention relates to a turbine 1, in particular a gas turbine, which along a swivel-mounted rotationally symmetrical rotor 2 has a compressor 3, a combustion chamber 5 and a turbine section 7 formed of a plurality of turbine stages 15, in which each turbine stage 15 contains mutually interacting blades 17 and vanes 16 which a hot working fluid 13 can flow around, with a coolant provided by the compressor 3 for cooling the blades 16, 17, which can flow in a channel along the rotor 2 from the compressor 3 to the turbine section 7 and into which a liquid can be introduced for cooling. In order to specify a turbine in which less wear occurs and in which the lifetime of the components is increased, it is proposed that the channel extends outside the rotor 2 and that the liquid can be introduced at the end of the channel which faces the compressor 2.

16 Claims, 2 Drawing Sheets

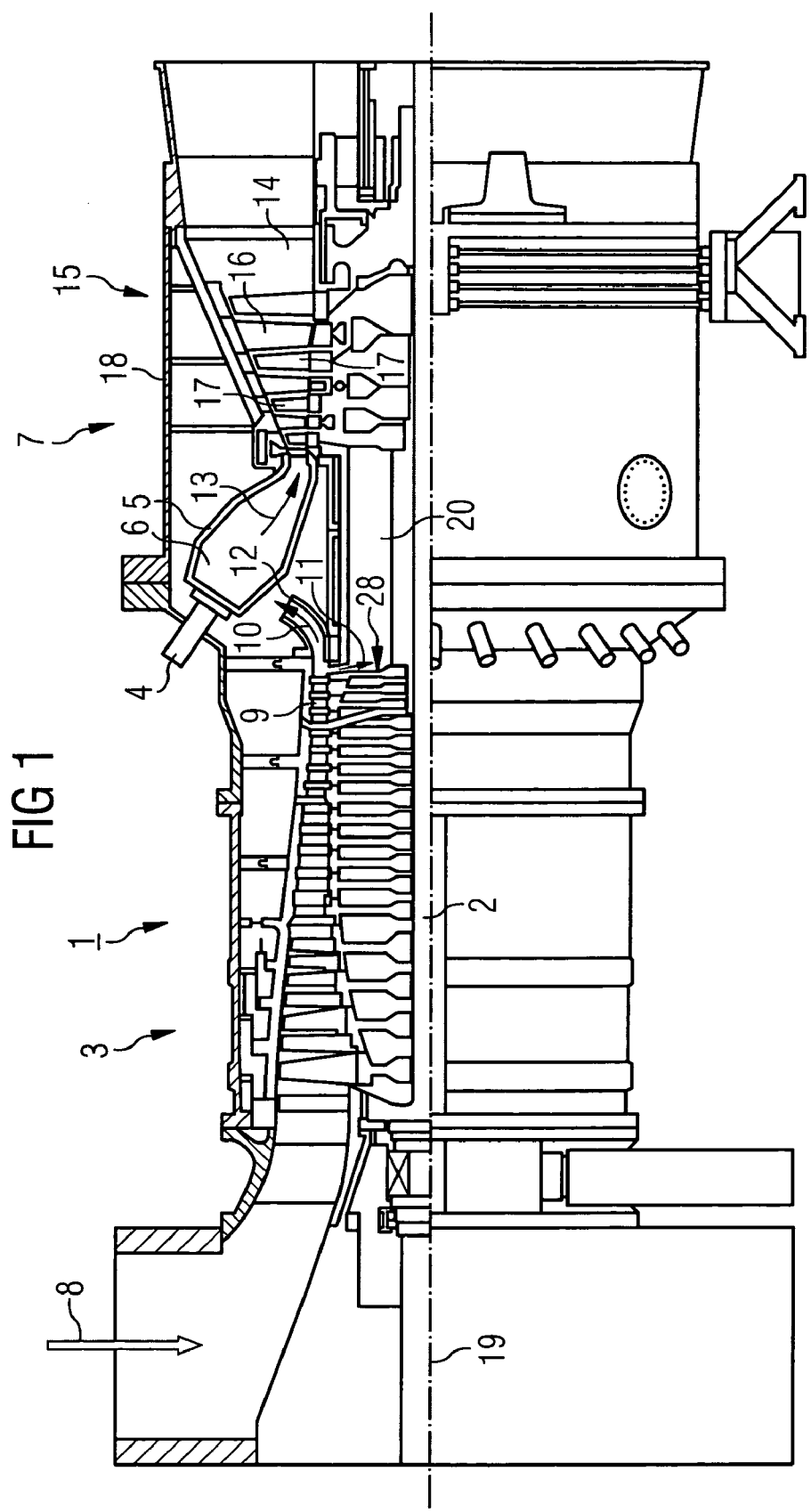

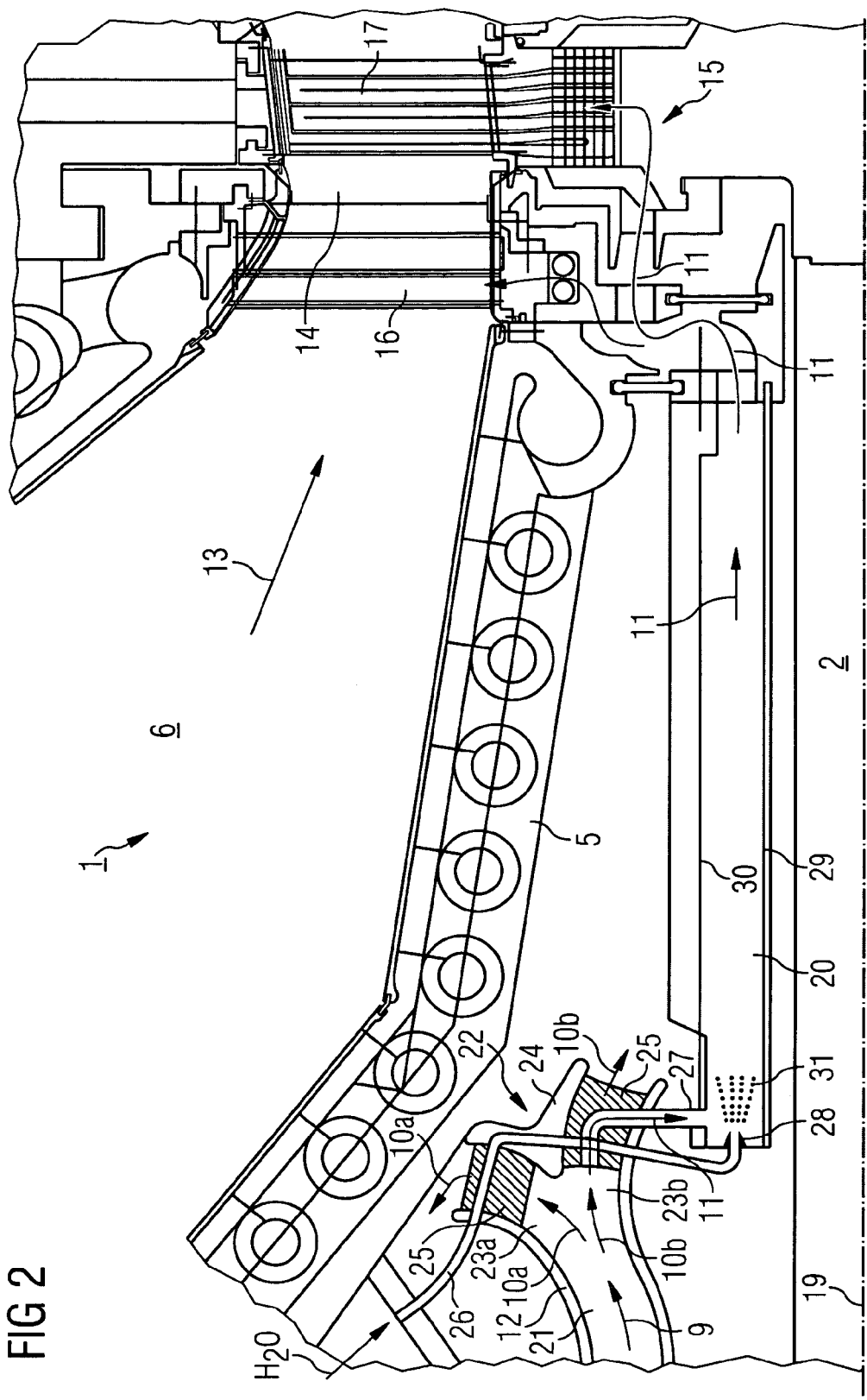

COOLING AIR AND INJECTED LIQUID SYSTEM FOR GAS TURBINE BLADES

CROSS REFERENCE TO RELATED APPLICATIONS

This application claims priority to the European application No. 02025194.8 EP, filed Nov. 11, 2002 under the European Patent Convention and which is incorporated by reference herein in its entirety.

FIELD OF THE INVENTION

The invention relates to a turbine according to the preamble of Claim 1.

BACKGROUND OF INVENTION

DE 28 52 057 discloses a cooled gas turbine, in which the cooling air extracted from the compressor is cooled by means of water injection. To this end the gas turbine has a water pipe which terminates in a water spray chamber. The water spray chamber is radially limited by the rotor on one side and by a fixed wall embracing the rotor on the other side. The water sprayed in atomizes in the water spray chamber into small water droplets, which evaporate there only partially. The rotor is cooled in this way. The cooled cooling air is then routed further to the blades of the front turbine stages. The water droplets remaining in the cooling air now evaporate in the blade, in order to keep the temperature of the cooling air low there.

The water droplets can lead to corrosion and wear on their path along the rotor and in the blade.

Moreover the water droplets in part wet the inner sides of the blade walls. The result is that particularly well cooled regions of the blade walls adjoin unwetted and thus less cooled regions. A significant temperature gradient can arise in the wall material at the transitions between these regions, which then results in thermal stresses. This can reduce the lifetime of the blade.

Furthermore, EP 0 447 886 A1 discloses an axial-flow cooled gas turbine with a compressor. The gas turbine has a turbine stage, the vanes and blades of which, arranged one behind the other in rings, are cooled by means of cooling air. To this end compressed air is extracted as a coolant downstream of the blade row of the last compressor stage and is routed along the rotor, which is in this case cooled by convection. The cooling air is then fed to the turbine stage downstream of the rotor in the direction of coolant flow.

SUMMARY OF THE INVENTION

Though EP 0 447 886 A1 does not deal with water-cooled and thus corrosion-prone turbines, the risk of the rotor parts overheating, in the region of the compressor outlet through to the turbine, nevertheless exists in the case of increased pressures in the compressor produced by a change in the ambient temperature and in the ambient pressure. This overheating of the rotor is associated with unwanted thermal expansions and/or mechanical stresses which can lead to wear.

The object of the invention is to reduce the wear on the turbine and to increase the lifetime of the components.

The object is achieved by the features of claim 1. Advantageous embodiments of the turbine are given in the subclaims.

The solution provides for the channel to extend outside the rotor and for it to be possible for the liquid to be introduced into the channel in a region close to the compressor. As a result of evaporation of the liquid in the channel the heat of evaporation is extracted from the coolant and is thus cooled. So that the evaporation process can proceed so that the liquid introduced evaporates in full and only in the channel area, the introduction of liquid takes place in the region of the channel close to the compressor, the channel area being selected to be long and big enough for evaporation to always be ensured in principle. The cooled coolant is then free of water droplets before leaving the channel, so that it is possible to avoid wetting the inner walls of the blades with water droplets. Corrosion caused by wetting does not occur and a significant temperature gradient in the material of the wall of the blade is prevented. Moreover coolant can be saved as a result of the cooling, which promotes the general efforts to increase the efficiency of the turbine.

The section of the rotor between compressor and turbine section is protected against corrosion, in that the channel is provided outside the rotor. Contact between water droplets and the rotor is thus avoided.

Furthermore the channel is followed downstream by a cooling channel system located in the rotor, which connects the channel to the cooling channels of the blades. To protect the cooling channel system and the rotor the cooling air must be free of water droplets when it leaves the channel. Otherwise corrosion could occur on the rotor.

The channel runs along the rotor and cools it. As a result, impermissible heating of the rotor is prevented, so that the axial and radial expansions of the rotor caused by the absorption of heat stay within the set limits. This prevents the ends of the rotors being touched by the housing or unforeseen axial pressure stresses at the bearings of the rotor. The result is low-wear operation of the turbine.

Particularly advantageous is the embodiment in which the channel is an annular channel formed coaxially to the rotor and through which coolant flows. The external channel wall radially facing the combustion chamber is in this case secured in torque-proof manner. Heating of the channel can be prevented if the channel is thermally insulated against the combustion chamber.

In an advantageous development the torque-proof internal wall is at a distance from the surface of the rotor. This produces a spatial and sealed separation from the chamber area in which the evaporation process occurs, and from the surface of the rotor, as a result of which the rotor is protected against corrosion.

In an annular gap between the rotor surface and the torque-proof internal chamber wall eddies of air occur during operation of the turbine as a result of the rotating rotor, which lead to an increased heat transfer. Hence the rotor can be simply cooled by the coolant by convection despite the annular gap. Since this axial section of the rotor is arranged radially between the hot combustion chamber and the axis of rotation, effective cooling of the rotor is important.

It is particularly advantageous if the liquid is introduced into the annular channel by means of a nozzle. The nozzle atomizes the liquid into a large number of small droplets, which then remove heat from the environment as a result of their aggregate state change from liquid to gas, and hence cool the coolant. The smaller the droplets in this case, the more easily the water evaporates in the annular channel and the sooner all droplets evaporate.

Advantageously the liquid is water, in particular distilled water.

The coolant is expediently the compressor outlet air. The compressed air provided by the compressor and thus the flow of cooling air flowing into the annular channel normally has a temperature of approximately 400° C., so that the aggregate state change of the injected water can thereby be supported.

Downstream of the compressor outlet, in the diffuser, a larger proportion of the compressed air, the compressor mass flow, is diverted to the burner and a smaller proportion of the compressed air is deflected further inside to the rotor as cooling air and is routed to the annular channel. A particular advantage is hence the embodiment in which the components facing the rotor are supported by means of diffuser ribs. They are secured on one side to the stator of the turbine and extend through the flow channel. On the other side they hold the components of the flow channel which face the rotor.

The annular shape of the turbine and its structure symmetrical to the axis of rotation of the rotor requires that the liquid provided from outside the turbine, which is introduced into the annular channel to generate evaporation coldness, must cross the compressor mass flow. To this end the diffuser ribs crossing the flow channel must be designed to be hollow, so that the pipe for the liquid runs in them. In this case the pipe communicates on the stator side with a source of liquid and on the rotor side with the nozzle which projects into the annular channel. The liquid required for cooling the coolant thus crosses the compressor mass flow without adversely affecting it any further. Alternatively the proportion of compressed air extracted from the compressor and used for cooling can be cooled externally by means of a heat exchanger. After this the externally cooled cooling air would have to cross the compressor mass flow, in order to reach the interior rotor. However, in this case a significantly larger volume flow would have to cross the compressor mass flow than with the proposed solution. Hence the introduction of a liquid into the annular channel, which is routed through a small-cross-section pipe through the diffuser ribs, is significantly simpler. Instead of the hollow diffuser ribs the pipe could also be routed through hollow supporting ribs which support the channel walls on the interior housing.

BRIEF DESCRIPTION OF THE DRAWINGS

The invention is explained on the basis of drawings, in which the figures show:

FIG. 1 a longitudinal part section through a gas turbine and

FIG. 2 a schematic longitudinal section through the rotor, the combustion chamber, the first turbine stage and the diffuser of the gas turbine according to FIG. 1

DETAILED DESCRIPTION OF INVENTION

FIG. 1 shows a longitudinal part section through a turbine 1 formed as a stationary gas turbine, said turbine 1 having a rotor 2, a compressor 3, a burner 4, an annular combustion chamber 5 with a combustion area 6 and a turbine section 7.

During operation of the turbine 1 one end of the compressor 3 draws in air 8, which is then provided as compressed air 9 at the other end. This is then split into an air mass flow 10 and a cooling air flow 11. The cooling air flow 11 is used to cool the turbine section 7 and the rotor 3, whereas the air mass flow 10 is used first to cool the annular combustion chamber 5 and then for combustion. To this end the air mass flow 10 is diverted by a diffuser 12 in the direction of the annular combustion chamber 5 after leaving the compressor 3 and from there is routed on to the burner 4. Subsequently in the burner 4 the air mass flow 10 is mixed with a combustion agent, which is then combusted in the combustion area 6 of the annular combustion chamber 5. The hot working fluid 13 flows along a hot gas channel 14 past turbine stages 15. Each turbine stage 15 is formed by two serially connected blade rings. Viewed from the direction of flow of the working fluid 13 a row formed of blades 17 follows a row of vanes formed of vanes 16. On the blades 17 which are mounted on the rotor 2 in contrast to the vanes 16 secured on the turbine housing 18, the working fluid 13 expands in pulse-like fashion and thus drives a generator (not shown) connected to the rotor 2, and the compressor 3.

The annular combustion chamber 5 is followed radially further inward by an annular channel 20 embracing the rotor 2.

FIG. 2 shows a schematic longitudinal section through the rotor 2, a compressor outlet 21, the diffuser 12, the annular combustion chamber 5 and the first turbine stage 15 of the turbine 1.

The annular combustion chamber 5 with the combustion area 6 is shown in part, in FIG. 2 above the diffuser 12. The combustion area 6 communicates with the hot gas channel 14, in which the vanes and blades 16, 17 are located.

The annular compressor outlet 21 is located downstream of the compressor 3 (not shown in FIG. 2) in terms of flow mechanics, said annular compressor outlet 21 terminating further downstream in the diffuser 12. In the diffuser 12 the flow channel is split for the compressed air 9 by means of a flow wedge 24 into two subchannels 23a, 23b (Y-shaped channel branching 22). The flow wedge 24 embraces the rotor 2 as a ring and is in this case connected to the diffuser 12 via a plurality of diffuser ribs 25; it is thus held fast by these. Each subchannel 23a, 23b is thus crossed by a plurality of diffuser ribs 25.

The diffuser rib 25 is hollow, with a pipe 26 running through it. The pipe 26 communicates on one side with a water source (not shown) and on the other side via other connecting pipes to a nozzle 28 located on the compressor-side end of the annular channel 20.

A cooling air extraction pipe 27 projects into the subchannel 23b in the manner of a periscope, said cooling air removal pipe 27 communicating with the end of the annular channel 20 which faces the compressor 3. The annular channel 20 embraces the rotor 2 in annular fashion, an internal wall 29 of the annular channel 20 embracing the rotor 2 at a distance. The radially external channel wall of the annular channel 20 is formed by an external wall 30 which is at a distance to the internal wall 29 and extends in the axial direction of the rotor 2. The external wall 30 in this case insulates the annular channel 20 thermally against the annular combustion chamber 5. The annular channel 20 is this formed annularly around the rotor 2 and extends in longitudinal direction parallel thereto.

During operation of the turbine 1 the compressor 3 compresses the air 8 it has drawn in, which then flows through the compressor outlet 21 into the diffuser 12. In the diffuser 12 the air 9 is split by the annular flow wedge 24 into two air mass flows 10a, 10b, both flows 10a, 10b being used to cool the annular combustion chamber 5 and subsequently for combustion of the combustion agent. Part of the air mass flow 10b flows into the cooling air extraction pipe 27 and is thus extracted therefrom. This part is diverted in such a way that it then flows into the annular channel 20 and flows there as a cooling air flow 11.

The water flows from the water source through connecting pipes to the pipe 26 and from there further to the nozzle 28. The water is injected into the annular channel 20 through the nozzle 28 and is atomized into a large number of water droplets 31. These evaporate completely therein as a result of the sufficiently large volume of the annular channel 20, heat being extracted from the environment, so that the cooling air flow 11 is cooled in the annular channel 20. A cooling air flow 11 that is too hot as a result of high pressures in the compressor 3 is thus cooled back down to the predefined temperature range. By changing the quantity of water injected the temperature of the cooling air flow 11 can be adjusted.

The cooling air flow 11 flows along the internal wall 29 through the annular channel 20 and cools the rotor 2 by convection. Air eddies occur in the annular gap between the fixed internal wall 29 and the rotating rotor surface, which favor the transfer of heat from the rotor to the internal wall 29. On the turbine-side end of the annular channel 20 the cooling air flow 11, which is then free of water droplets, then enters a cooling channel system in the rotor 2, which routes the cooling air flow 11 onward to the vanes 16 and to the blades 17 of the first turbine stage 15. These are then cooled with the cooled cooling air flow 11, without corrosion or thermal stresses being caused by water droplets.

The invention claimed is:

1. A turbine, comprising:
   a swivel-mounted rotationally symmetrical rotor;
   a compressor mounted along the rotor;
   a combustion chamber mounted along the rotor;
   a turbine section mounted along the rotor and formed of a plurality of turbine stages in which each turbine stage comprises mutually interacting blades and vanes which are surrounded by a flow of hot working fluid; and
   a coolant provided by the compressor for cooling the blades and the vanes, the coolant flowing in a channel along the rotor from the compressor to the turbine section and into which a liquid is adapted to be introduced for cooling, wherein the channel extends outside the rotor such that the liquid is introduced into the channel in a region close to the compressor,
   wherein a flow channel downstream of the compressor outlet in the direction of flow of the compressor air contains a at least one passing through said flow channel,
   wherein a radially external end of the at least one is secured on the stator of the turbine and the radially internal end opposite the external end faces the rotor,
   wherein at least one rib is hollow and a pipe runs in the rib, the pipe communicating on a stator side with a source of liquid and on the rotor side with a nozzle used to introduce the liquid in the channel.

2. A turbine according to claim 1, wherein the channel runs along the rotor and that the rotor is cooled by the coolant.

3. A turbine according to claim 1, wherein the channel is an annular channel formed coaxially to the rotor and through which the coolant flows, a torque-proof and thermally insulating external wall of the channel radially facing the combustion chamber.

4. A turbine according to claim 1, wherein a torque-proof internal channel wall is spaced from the surface of the rotor.

5. A turbine according to claim 1, wherein the liquid is introduced into an annular channel by a nozzle.

6. A turbine according to claim 1, wherein the liquid is water.

7. A turbine according to claim 1, wherein the coolant is c outlet air from the compressor.

8. A turbine according to claims 1, wherein an internal wall and the external channel wall are supported by support ribs on an internal housing of the turbine.

9. A turbine according to claim 6, wherein the liquid is distilled water.

10. A gas turbine with a turbine comprising:
    a swivel-mounted rotationally symmetrical rotor;
    a compressor mounted along the rotor;
    a combustion chamber mounted along the rotor;
    a turbine section mounted along the rotor formed of a plurality of turbine stages in which each turbine stage comprises mutually interacting blades and vanes which are surrounded by a flow of hot working fluid; and
    a coolant provided by the compressor for cooling the blades and the vanes, The coolant flowing in a channel along the rotor from the compressor to the turbine section and into which a liquid is adapted to be introduced for cooling, wherein the channel extends outside the rotor, and the liquid is introduced into the channel in a region close to the compressor,
    wherein a flow channel downstream of the compressor outlet in the direction of flow of the compressor air contains a at least one passing through said flow channel,
    wherein a radially external end of the at least one is secured on the stator of the turbine and the radially internal end opposite the external end faces the rotor,
    wherein at least one rib is hollow and a pipe runs in the rib, the pipe communicating on a stator side with a source of liquid and on the rotor side with a nozzle used to introduce the liquid in the channel.

11. A turbine according to claim 1, wherein the turbine is a gas turbine.

12. A gas turbine according to claim 10, wherein the channel is an annular channel formed coaxially to the rotor and through which the coolant flows, a torque-proof and thermally insulating external wall of the channel radially facing the combustion chamber.

13. A gas turbine according to claim 10, wherein a torque-proof internal channel wall is spaced from the surface of the rotor.

14. A gas turbine according to claim 10, wherein the liquid is introduced into an annular channel by a nozzle.

15. A gas turbine according to claim 10, wherein the coolant is outlet air from the compressor.

16. A turbine, comprising:
    a rotationally supported rotor shaft having an axis of rotation along a longitudinal axis of the rotor;
    a compressor arranged concentric with and surrounding the rotor;
    an annular flow channel arranged concentric with the rotor and downstream of an outlet of the compressor with respect to a flow direction of a working fluid of the turbine, the annular flow channel having a hollow diffuser rib passing through the flow channel, wherein a radially external end of the diffuser rib is secured on a stator of the turbine and a radially internal end opposite the external end faces the rotor, and a liquid coolant supply pipe runs within the hollow rib to introduce the liquid into the annular channel;
    a combustion chamber arranged concentric with the rotor and downstream of the compressor; and
    a turbine section arranged along the rotor and formed from a plurality of turbine stages in which each turbine stage comprises mutually interacting blades and vanes surrounded by a flow of the working fluid.

* * * * *